(12) United States Patent
Hu

(10) Patent No.: US 10,353,213 B2
(45) Date of Patent: Jul. 16, 2019

(54) SEE-THROUGH DISPLAY GLASSES FOR VIEWING 3D MULTIMEDIA

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 268 days.

(21) Appl. No.: 15/405,067

(22) Filed: Jan. 12, 2017

(65) Prior Publication Data
US 2018/0164599 A1 Jun. 14, 2018

Related U.S. Application Data

(63) Continuation-in-part of application No. 15/372,957, filed on Dec. 8, 2016, now Pat. No. 9,946,075.

(51) Int. Cl.
| | |
|---|---|
| *G02B 27/26* | (2006.01) |
| *G02B 27/22* | (2018.01) |
| *F21V 8/00* | (2006.01) |
| *G02B 15/04* | (2006.01) |
| *G02B 27/28* | (2006.01) |
| *G02B 5/04* | (2006.01) |
| *G02B 27/00* | (2006.01) |
| *G02B 27/01* | (2006.01) |

(52) U.S. Cl.
CPC ............. *G02B 27/26* (2013.01); *G02B 5/04* (2013.01); *G02B 6/0005* (2013.01); *G02B 27/0025* (2013.01); *G02B 27/0172* (2013.01); *G02B 27/2264* (2013.01); *G02B 27/283* (2013.01); *G02B 2027/0134* (2013.01); *G02B 2027/0178* (2013.01)

(58) Field of Classification Search
CPC ........ G02B 27/26; G02B 5/04; G02B 6/0005; G02B 27/2264; G02B 27/0172; G02B 27/283
See application file for complete search history.

(56) References Cited

U.S. PATENT DOCUMENTS

| | | | | |
|---|---|---|---|---|
| 5,198,928 A | * | 3/1993 | Chauvin | G02B 27/0172 359/465 |
| 6,053,936 A | * | 4/2000 | Koyama | A61M 21/00 600/27 |
| 9,759,932 B1 | * | 9/2017 | Ainsworth | G02C 11/10 |
| 2012/0147280 A1 | * | 6/2012 | Osterman | G02B 27/26 349/9 |
| 2014/0218648 A1 | * | 8/2014 | Palmer | G02B 27/2264 349/15 |
| 2015/0205126 A1 | * | 7/2015 | Schowengerdt | G06T 13/40 345/633 |

(Continued)

*Primary Examiner* — Edward J Glick
*Assistant Examiner* — Anthony G Quash
(74) *Attorney, Agent, or Firm* — Joe Zheng

(57) ABSTRACT

Architecture and designs of wearable devices for viewing multimedia in 3D are described. According to one aspect of the present invention, a display device is made in form of a pair of glasses. A separate enclosure is provided to generate content for display on the glasses. The content is optically picked up by an optical cable and transported by one or more optical fibers in the optical cable to the glasses, where an image polarizer receives the content and produces an alternating polarized content sequence. An optical cube is provided to decouple the alternating polarized content sequence into two orthogonally polarized image sequences are respectively projected onto two lenses.

16 Claims, 19 Drawing Sheets

(56) References Cited

U.S. PATENT DOCUMENTS

| | | | |
|---|---|---|---|
| 2015/0234477 A1* | 8/2015 | Abovitz | G06K 9/00671 |
| | | | 382/103 |
| 2016/0033771 A1* | 2/2016 | Tremblay | G02B 26/10 |
| | | | 345/8 |
| 2016/0041354 A1* | 2/2016 | Guenter | G02B 6/4432 |
| | | | 385/86 |

\* cited by examiner

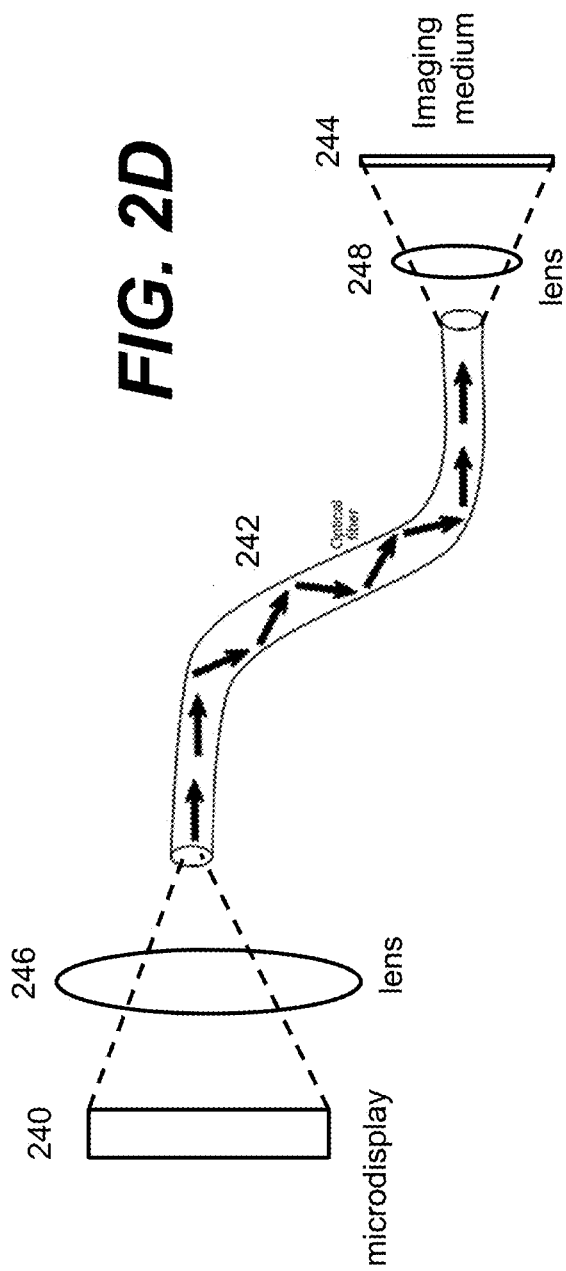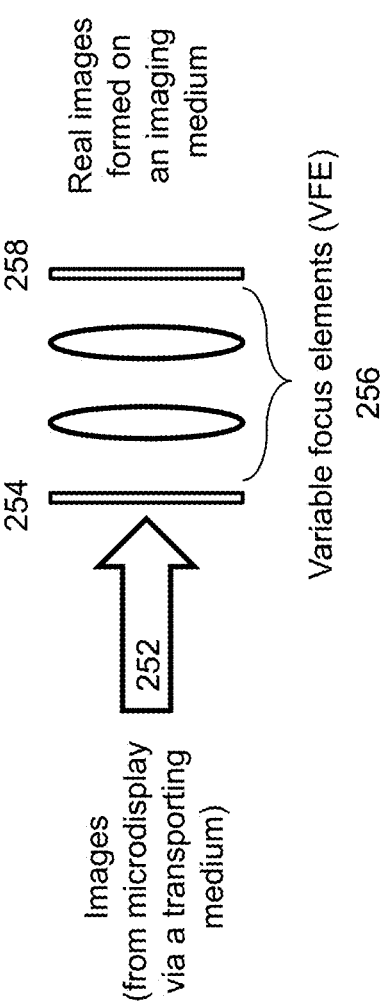
FIG. 2D
FIG. 2E

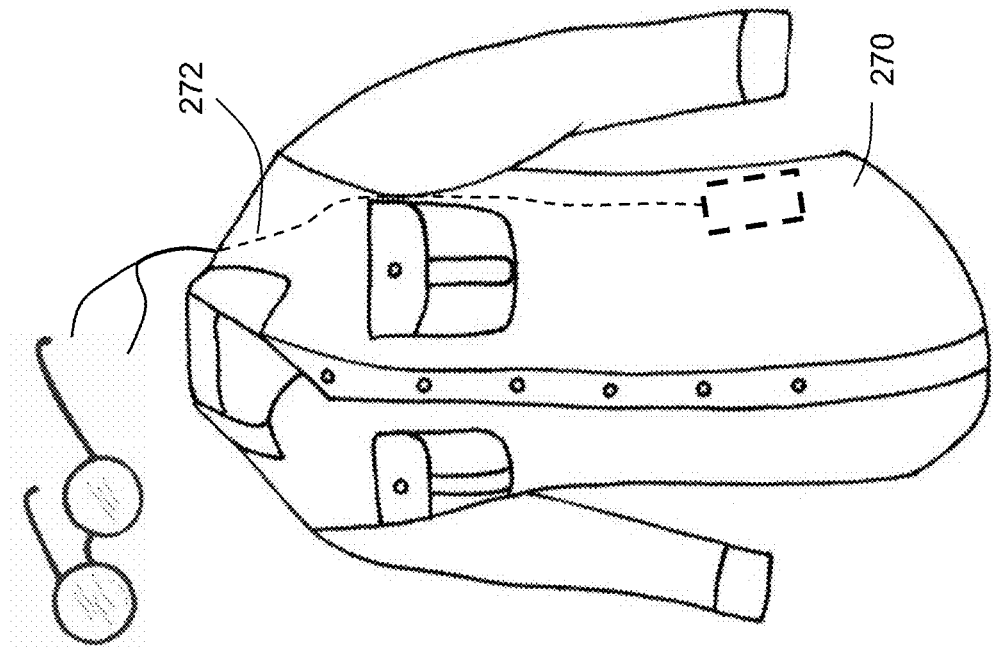

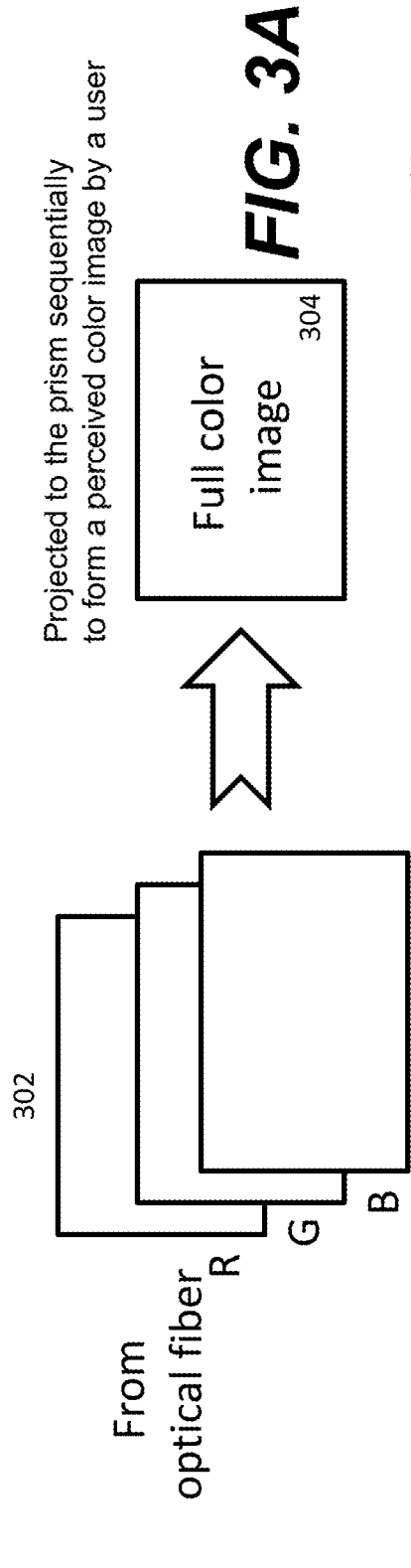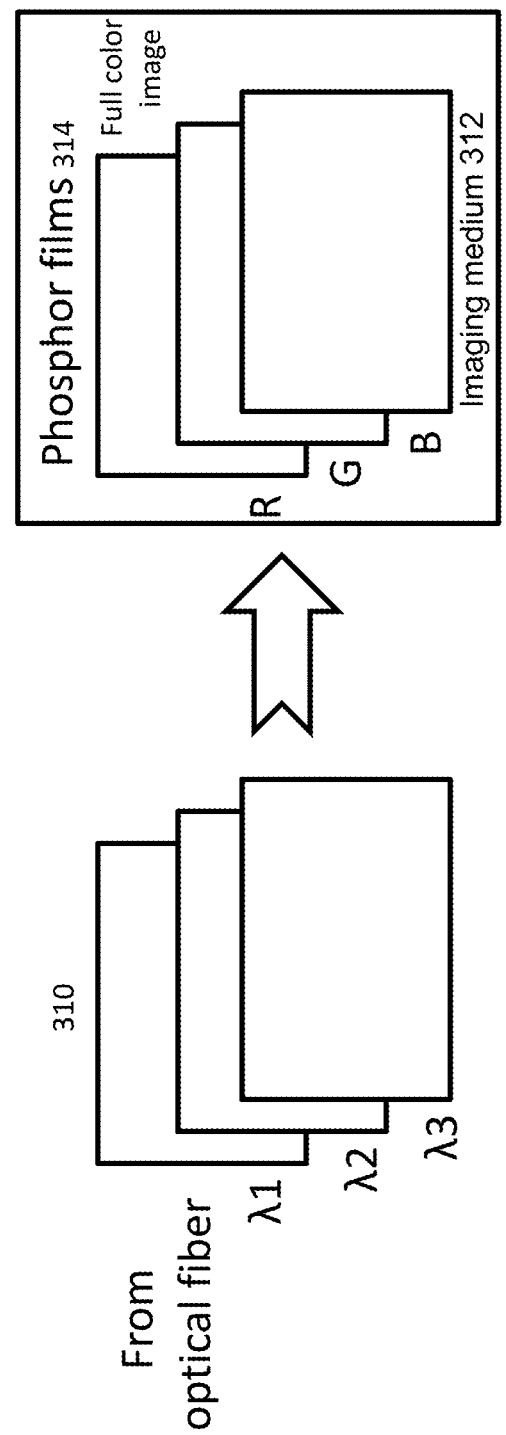

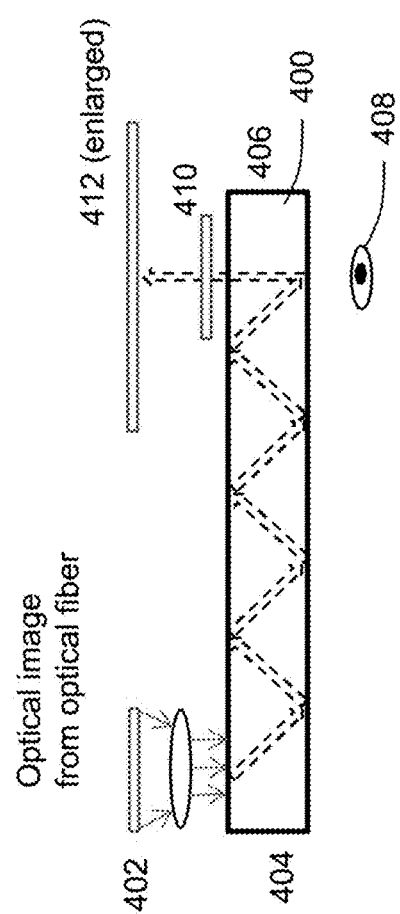

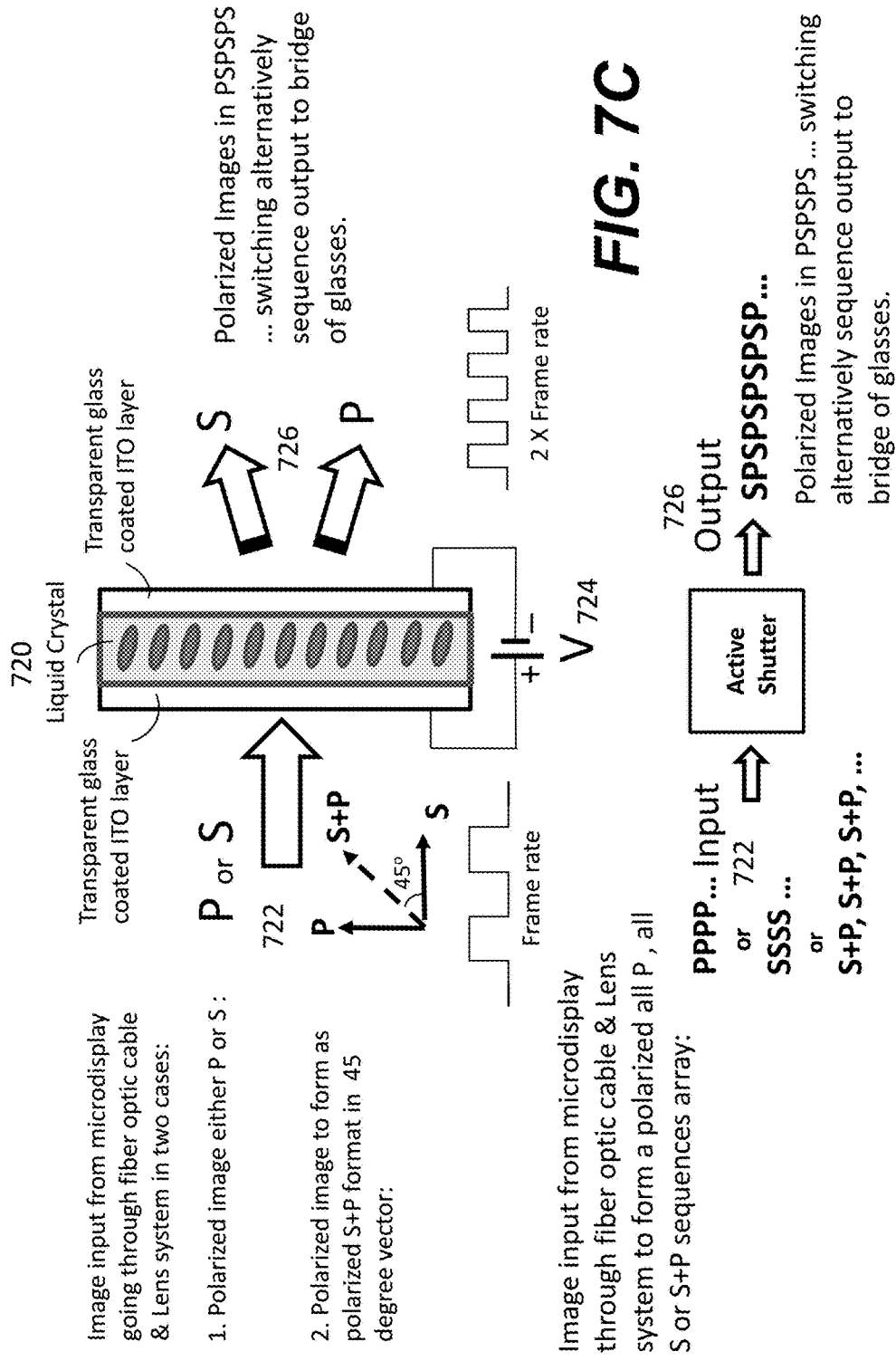

SEE-THROUGH DISPLAY GLASSES FOR VIEWING 3D MULTIMEDIA

BACKGROUND OF THE INVENTION

Field of the Invention

The present invention generally relates to the area of display devices and more particularly relates to architecture and designs of display devices, where a display device is made in form of a pair of glasses, and may be used in various applications including virtual reality augmented reality with 3D capabilities.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (1.2 lbs). With the weight, a wearer won't feel comfortable when wearing it for a period. Indeed, what is available in the market is generally heavy and bulky in comparison to normal glasses. Thus there is a further need for a wearable AR/VR viewing or display device that looks similar to a pair of regular glasses but is also amenable to smaller footprint, enhanced impact performance, lower cost packaging, and easier manufacturing process.

Most of the wearable AR/VR viewing or display devices are capable of displaying 3D videos or images based on the 3D content. There is yet another need for a pair of see-through glasses capable of showing 3D displays.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of wearable devices for virtual reality and augmented reality applications. According to one aspect of the present invention, a display device is made in form of a pair of glasses and includes a minimum number of parts to reduce the complexity and weight thereof. A separate case or enclosure is provided as portable to be affixed or attached to a user (e.g., a pocket or waist belt). The enclosure includes all necessary parts and circuits to generate content for virtual reality and augmented reality applications, resulting in a minimum number of parts needed on the glasses, hence smaller footprint, enhanced impact performance, lower cost packaging, and easier manufacturing process of the glasses. The content is optically picked up by an optical cable and transported by optical fibers in the optical cable to the glasses, where the content is projected respectively to the lenses specially made for displaying the content before the eyes of the wearer.

According to another aspect of the present invention, the glasses (i.e., the lenses therein) and the enclosure are coupled by an optical cable including at least one optical fiber, where the fiber is responsible for transporting the content or an optical image from one end of the optical fiber to another end thereof by total internal reflections within the fiber. The optical image is picked up by a focal lens from a micro display device or simply microdisplay in the enclosure.

According to still another aspect of the present invention, each of the lenses includes a prism in a form that propagates an optical image being projected onto one edge of the prism to an optical path that a user can see the optical image. The prism is also integrated with or stacked on an optical correcting lens that is complementary or reciprocal to that of the prism to form an integrated lens for the glasses. The optical correcting lens is provided to correct an optical path from the prism to allow the user to see through the integrated lens without optical distortions.

According to still another aspect of the present invention, each of the lenses includes an optical waveguide that propagates an optical image being projected onto one end of the waveguide to another end with an optical path that a user can see the optical image. The waveguide may also be integrated with or stacked on an optical correcting lens to form an integrated lens for the glasses.

According to still another aspect of the present invention, the integrated lens may be further coated with one for more films with optical characteristics that amplify the optical image before the eyes of the user.

According to still another aspect of the present invention, the glasses include a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

According to still another aspect of the present invention, instead of using two optical cables to transport the images from two microdisplays, a single optical cable is used to transport the images from one microdisplay. The optical cable may go through either one of the temples of the glasses. A splitting mechanism disposed near or right on the bridge of the glasses is used to split the images into two versions, one for the left lens and the other for the right lens. These two images are then respectively projected into the prisms or waveguides that may be used in the two lenses.

According to still another aspect of the present invention, the optical cable is enclosed within or attached to functional multi-layer structures which form a portion of an article of clothing. When a user wears a shirt made or designed in accordance with one of the embodiment, the cable itself has less weight while the user can have more activities.

According to yet another aspect of the present invention, the glasses includes a pair of two different (e.g., orthogonal) polarized plates to display one polarized image on one of the two glasses lenses and another polarized image on another one of the two glasses lenses so that a wearer of the glasses can view multimedia in 3D.

The present invention may be implemented as an apparatus, a method; and part of system. Different implementations may yield different benefits, objects and advantages. In one embodiment, the present invention is a display apparatus for displaying 3D multimedia, the display apparatus comprises an image polarizer receiving an optical image sequence and producing an alternating polarized image sequence; and an optical cube provided to receive the alternating polarized image sequence, wherein the optical cube includes two orthogonally polarized plates sandwiching the optical cube, and decouples the alternating polarized image sequence into two orthogonally polarized image sequences. The display apparatus further comprises a pair of projection mechanisms respectively for two eyes of a human being, wherein each of the projection mechanisms receives one of the two orthogonally polarized image sequences.

According to another embodiment, the present invention is a display apparatus for displaying 3D multimedia, the display apparatus comprises a pair of lenses; a bridge disposed between the lenses; and an image polarizer receiving an optical image sequence and producing an alternating polarized image sequence, wherein the optical image sequence is transported by an optical cable including an optical fiber. The display apparatus further comprises an optical cube, disposed near or on the bridge, receiving the alternating polarized image sequence, wherein the optical cube sandwiched between two orthogonally polarized plates splits the alternating polarized image sequence into two orthogonally polarized image sequences, each projected into an edge of one of the two lenses.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2D shows how an image is being transported from a microdisplay via a fiber cable to an imaging medium;

FIG. 2E shows a set of exemplary variable focus elements (VFE) to accommodate an adjustment of the projection of an image onto an optical object (e.g., an imaging medium or a prism);

FIG. 2I shows a shirt in which an optical cable is enclosed within the shirt or attached thereto;

FIG. 3A shows how three single color images are being combined visually and perceived as a full color image by human vision;

FIG. 3B shows that three different color images are generated under three lights respectively at wavelengths $\lambda$, $\lambda 2$, and $\lambda 3$, the imaging medium includes three films, each coated with a type of phosphor.

FIG. 4 shows that a waveguide is used to transport an optical image from one end of the waveguide to another end thereof;

FIG. 7C shows that a liquid crystal panel acted as active shutter is used to polarize an image sequence.

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-7D. However, those skilled in the art will readily appreciate that the detailed description given herein with respect to these figures is for explanatory purposes as the invention extends beyond these limited embodiments.

Figure 1A:
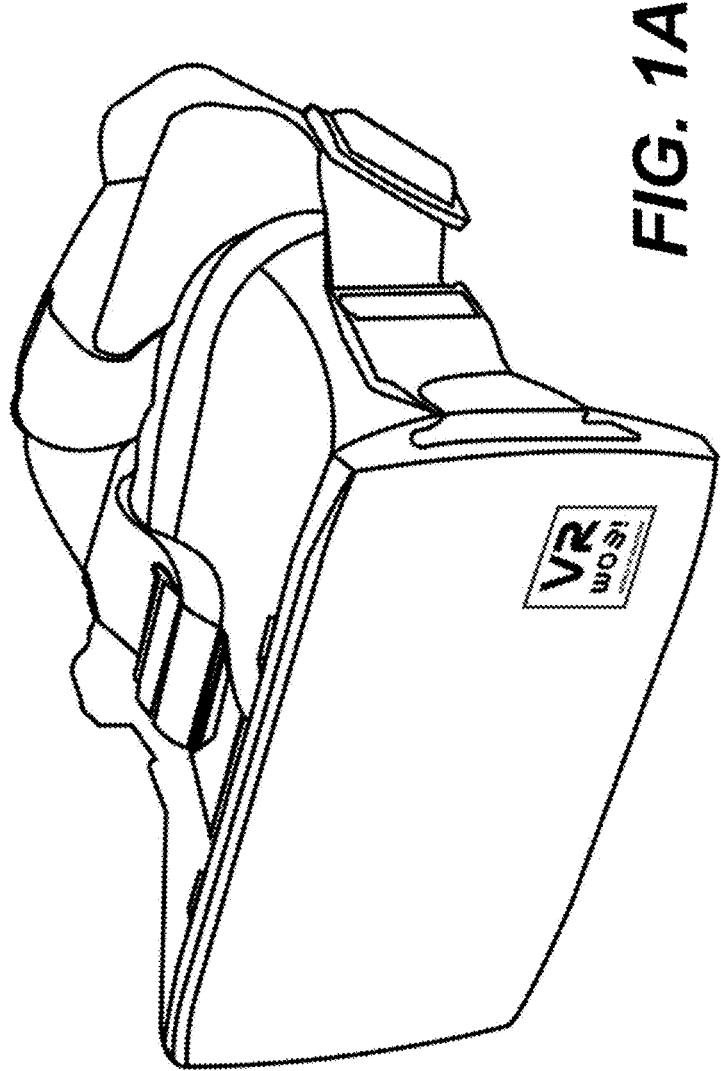
FIG. 1A shows an exemplary goggle now commonly seen in the market for the application of delivering or displaying VR or AR.
Figure 1B:
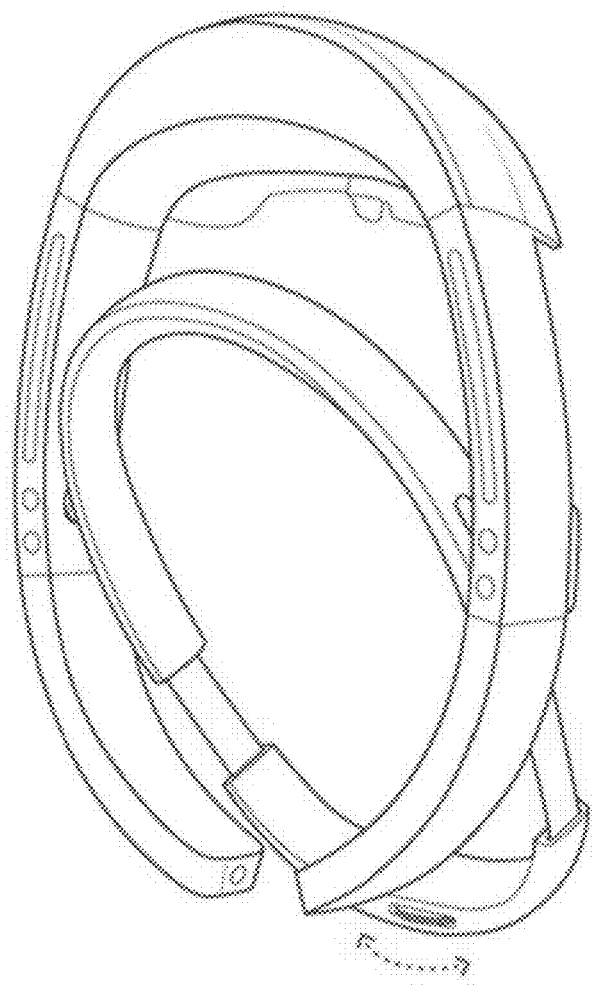
FIG. 1B shows a sketch of HoloLens from Microsoft.
Figure 2A:
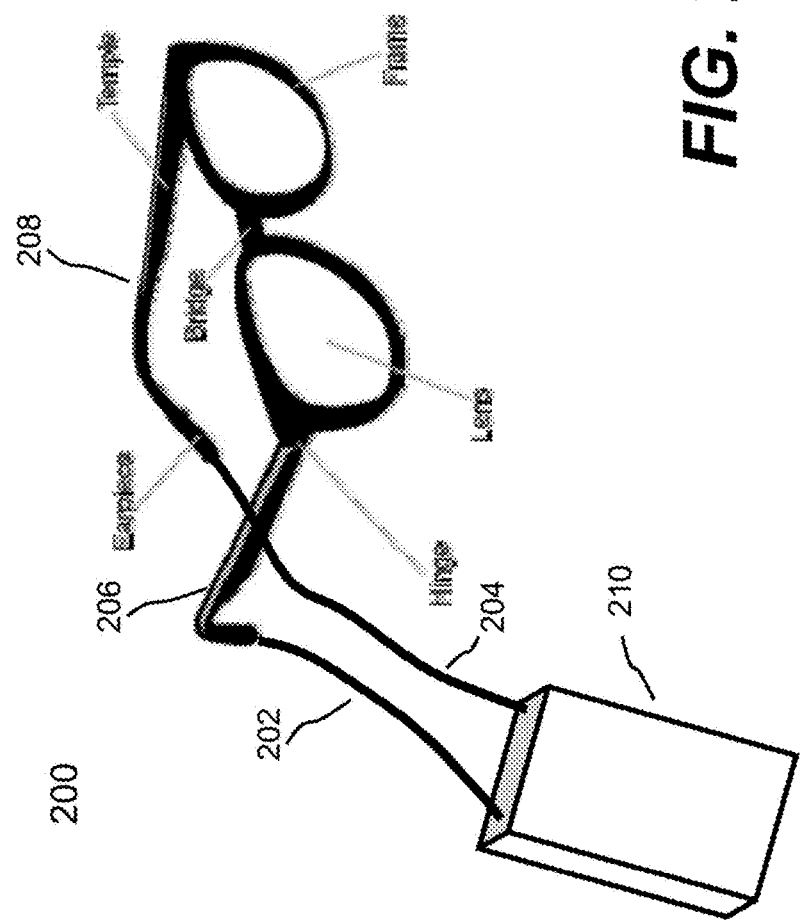
FIG. 2A shows a pair of exemplary glasses that can be used for the application of VR according to one embodiment of the present invention.

Referring now to the drawings, in which like numerals refer to like parts throughout the several views. FIG. 2A shows a pair of exemplary glasses 200 that are used for applications of VR/AR according to one embodiment of the present invention. The glasses 200 appear no significant difference to a pair of normal glasses but include two flexible cables 202 and 204 that are respectively extended from the temples 206 and 208. According to one embodiment, each pair of the two flexible cables 202 and the temples 206 and 208 are integrated or removably connected at one end thereof and include one or more optical fibers.

Both of flexible cables 202 are coupled at another end thereof to a portable computing device 210, where the computing device 210 generates images based on a microdisplay that are captured by the cables 202. The images are transported through the optical fibers in the flexible cables 202 by the total internal reflections therein all the way to another end of the optical fibers, where the images are projected onto the lenses in the glasses 200.

Figure 2B:
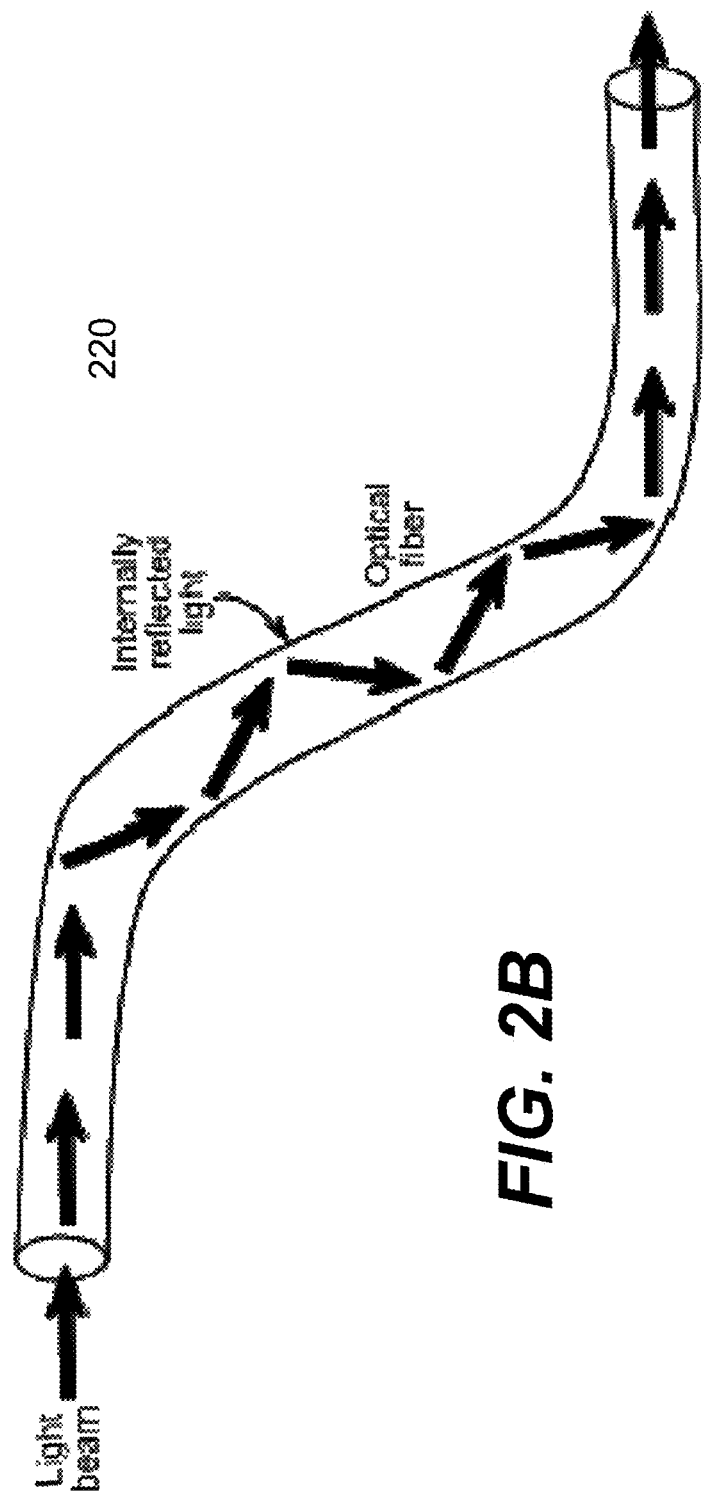
FIG. 2B illustrates that an optical fiber is used to transmit light from one place to the other along curved path in a more effective manner or by total internal reflections within the fiber.

According to one embodiment, each of the two flexible cables 202 includes one or more optical fibers. Optical fibers are used to transmit light from one place to the other along curved path in a more effective manner as shown in FIG. 2B. In one embodiment, the optical fibers are formed with thousands of strands of a very fine quality glass or quartz of refractive index about 1.7 or so. The thickness of a strand is tine. The strands are coated with a layer of some material of lower refractive index. The ends of the strands are polished and clamped firmly after aligning them carefully. When light is incident at a small angle at one end, it gets refracted into the strands (or fibers) and gets incident on the interface of the fibers and the coating. The angle of incidence being greater than the critical angle, the ray of light undergoes total internal reflections and essentially transports the light from one end to another end even if the fiber is bent. Depending on the implementation of the present invention, a single fiber or a plurality of fibers arranged in parallel may be used to transport an optical image projected onto one end of the fiber or fibers to another end thereof.

Figure 2C:
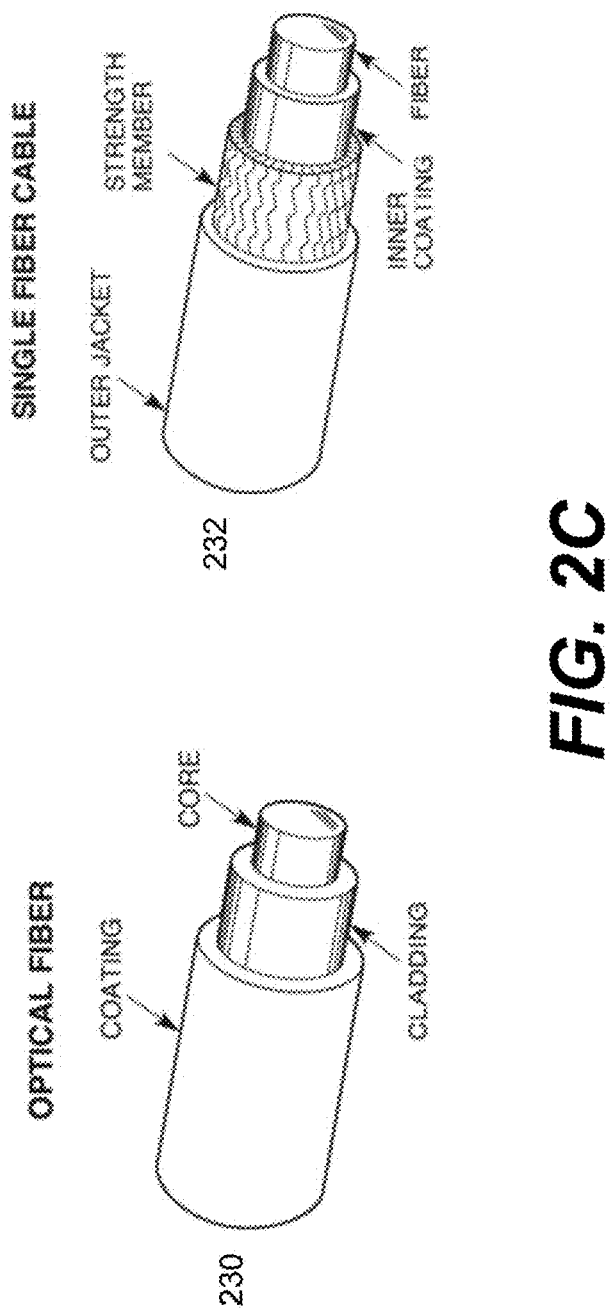
FIG. 2C shows two exemplary ways to encapsulate a fiber or a plurality of fibers according to one embodiment of the present invention.

FIG. 2C shows two exemplary ways to encapsulate a fiber or a plurality of fibers according to one embodiment of the present invention. The encapsulated fiber or fibers may be used as the cable 202 or 204 in FIG. 2A and extended through each of the non-flexible temples 206 and 208 all the way to the end thereof. According to one embodiment, the temples 206 and 208 are made of a type of material (e.g., plastic or metal) commonly seen in a pair of regular glasses, a portion of the cable 202 or 204 is embedded or integrated in the temple 206 or 208, resulting in a non-flexible part while another portion of the cable 202 or 204 remains flexible. According to another embodiment, the non-flexible part and the flexible part of the cable 202 or 204 may be removably connected via a type of interface or connector.

Referring now to FIG. 2D, it shows how an image is being transported from a microdisplay 240 via a fiber cable 242 to an imaging medium 244. As will be further described below, an imaging medium 244 may be a physical thing (e.g., films) or non-physical thing (e.g., the air). A microdisplay is a display that has a very small screen (e.g., less than an inch). This type of tiny electronic display system was introduced commercially in the late 1990s. The most common applications of microdisplays include rear-projection TVs and head-mounted displays. Microdisplays may be reflective or transmissive depending upon the way light is allowed to pass through the display unit. Through a lens 246, an image (not shown) displayed on the microdisplay 240 is picked up by one end of the fiber cable 242 that transports the image to the other end of the fiber cable 242. Another lens 248 is provided to collect the image from the fiber cable 242 and projects it to the imaging medium 244. Depending on the implementation, there are different types of microdisplays and imaging mediums. Some of the embodiments of the microdisplays and imaging mediums will be described in detail below.

FIG. 2E shows a set of exemplary variable focus elements (VFE) 250 to accommodate an adjustment of the projection of an image onto an optical object (e.g., an imaging medium or a prism). To facilitate the description of various embodiments of the present invention, it is assumed that there is an image medium. As illustrated in FIG. 2E, an image 252 transported by a fiber cable reaches the end surface 254 of the fiber cable. The image 252 is focused by a set of lens 256, referred to herein as variable focus elements (VFE), onto an imaging medium 258. The VFE 256 is provided to be adjusted to make sure that the image 252 is precisely focused onto the imaging medium 258. Depending on the implementation, the adjustment of the VFE 256 may be done manually or automatically in accordance with an input (e.g., a measurement obtained from a sensor). According to one embodiment, the adjustment of the VFE 256 is performed automatically in accordance with a feedback signal derived from a sensing signal from a sensor looking at an eye (pupil) of the wearer wearing the glasses 200 of FIG. 2A.

Figure 2F:
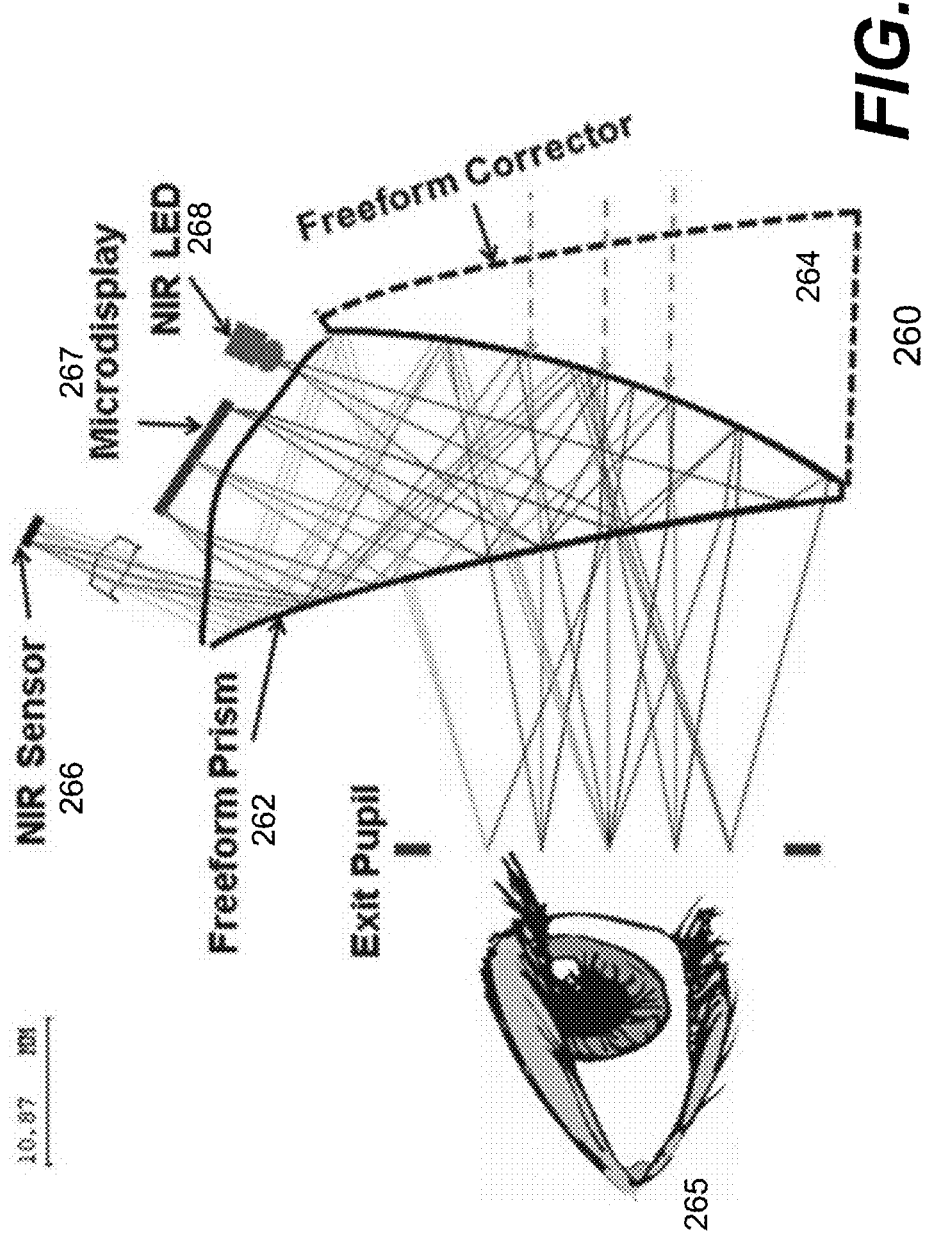
FIG. 2F shows an exemplary lens that may be used in the glasses shown in FIG. 2A, where the lens includes two parts, a freeform prism used for VR and an additional optical correcting lens or freeform corrector when needed for AR.

Referring now to FIG. 2F, it shows an exemplary lens 260 that may be used in the glasses shown in FIG. 2A. The lens 260 includes two parts, a prism 262 and an optical correcting lens or corrector 264. The prism 262 and the corrector 264 are stacked to form the lens 260. As the name suggests, the optical corrector 264 is provided to correct the optical path from the prism 262 so that a light going through the prism 262 goes straight through the corrector 264. In other words, the refracted light from the prism 262 is corrected or de-refracted by the corrector 264. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 262 is not in fact in the shape of geometric prisms, hence the prism 262 is referred herein as a freeform prism, which leads the corrector 264 to a form complementary, reciprocal or conjugate to that of the prism 262 to form the lens 260.

On one edge of the lens 260 or the edge of the prism 262, there are at least three items utilizing the prism 262. Referenced by 267 is an imaging medium corresponding to the imaging medium 244 of FIG. 2D or 258 of FIG. 2E. Depending on the implementation, the image transported by the optical fiber 242 of FIG. 2D may be projected directly onto the edge of the prism 262 or formed on the imaging medium 267 before it is projected onto the edge of the prism 262. In any case, the projected image is refracted in the prism 262 and subsequently seen by the eye 265 in accordance with the shapes of the prism 262. In other words, a user wearing a pair of glasses employing the lens 262 can see the image being displayed through or in the prism 262.

A sensor 266 is provided to image the position or movement of the pupil in the eye 265. Again, based on the refractions provided by the prism 262, the location of the pupil can be seen by the sensor 266. In operation, an image of the eye 265 is captured. The image is analyzed to derive how the pupil is looking at the image being shown through or in the lens 260. In the application of AR, the location of the pupil may be used to activate an action. Optionally, a light source 268 is provided to illuminate the eye 265 to facilitate the image capture by the sensor 266. According to one embodiment, the light source 268 uses a near inferred source as such the user or his eye 265 would not be affected by the light source 268 when it is on.

Figure 2G:
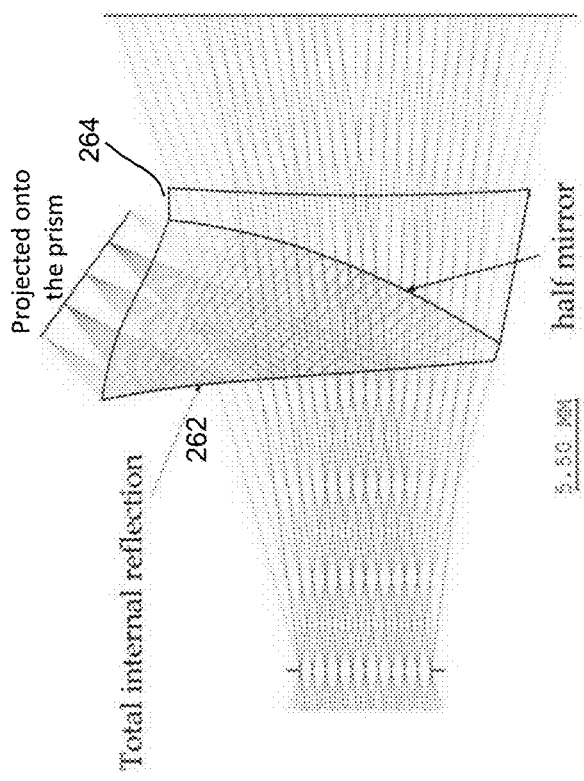
FIG. 2G shows the internal reflections from a plurality of sources (e.g., a sensor, an imaging medium and a plurality of light sources) in an irregular prism.
Figure 2H:
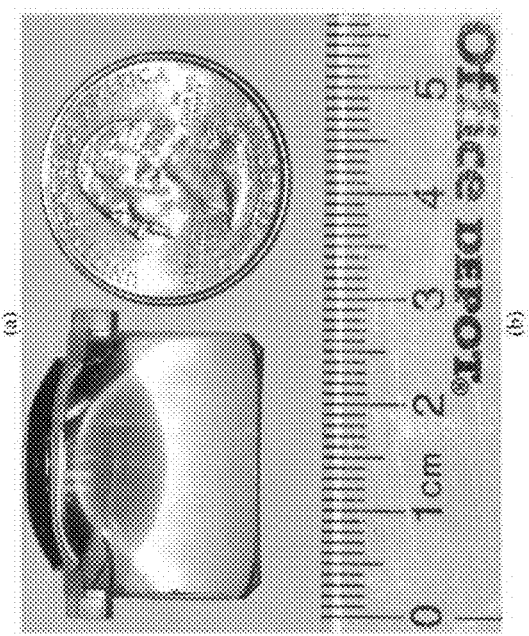
FIG. 2H shows a comparison of such an integrated lens to a coin and a ruler.

FIG. 2G shows the internal reflections from a plurality of sources (e.g., the sensor 266, the imaging medium 267 and the light source 268). As the prism is uniquely designed in particular shapes or to have particular edges, the rays from the sources are reflected several times within the prism 268 and subsequently impinge upon the eye 265. For completeness, FIG. 2H shows a comparison of such a lens to a coin and a ruler in sizes.

As described above, there are different types of microdisplays, hence different imaging mediums. The table below summarizes some of the microdisplays that may be used to facilitate the generation of an optical image that can be transported by one or more optical fibers one end to another end thereof by total internal reflection within the optical fiber(s).

| No. | Microdisplay types | Features | Notes |
|---|---|---|---|
| 1. | LCoS (LCD and OLED) | Full color image displayed on a silicon | A single image |
| 2. | LCoS + LED (RGB sequentially) LCoS + laser (visible, RGB sequentially) LCoS + laser (non-visible) | A single color image displayed at a time | Three images |
| 3. | SLM + laser (RGB sequentially) | A single optical color image | Three optical images |
| 4. | SLM + laser (non-visible) | A single non-visible color image | Need conversion |
| 5. | MEMS + laser scanning (RGB sequentially) | A single color image displayed at a time | Three images |
| 6. | MEMS + laser scanning (RGB combined in full color) | Full color image displayed through combined color pixel scanning | A single image |
| 7. | MEMS + Laser scanning (non-visible) | A single non-visible color image | Need conversion |

LCoS = Liquid crystal on silicon;
LCD = Liquid crystal display;
OLED = Organic light-emitting diode;
RGB = Red, Green and Blue;
SLM = Spatial light modulation; and
MEMS = Micro-Electro-Mechanical System (such as, Micro-mirror DLP).

In the first case shown above in the table, a full color image is actually displayed on a silicon device i.e. LCoS). As shown in FIG. 2D, the full color image can be picked up by a focal lens or a set of lenses that project the full image right onto one end of the fiber. The image is transported within the fiber and picked up again by another focal lens at the other end of the fiber. As the transported image is visible and full color, the imaging medium 244 of FIG. 2D may not be physically needed. The color image can be directly projected onto one edge of the prism 262 of FIG. 2F.

In the second case shown above in the table, an LCoS is used with different light sources. In particular, there are at least three colored light sources (e.g., red, green and blue) used sequentially. In other words, a single color image is generated per one light source. The image picked up by the fiber is only a single color image. A full color image can be reproduced when all three different single color images are combined. The imaging medium 244 of FIG. 2D is provided to reproduce the full color image from the three different single color images transported respectively by the optical fiber.

FIG. 2I shows a shirt 270 in which an optical cable 272 is enclosed within the shirt 270 or attached thereto. The shirt 270 is an example of multi-layers. Such a relatively thin cable can be embedded into the clothing material (the multi-layers). When a user wears such a shirt made or designed in accordance with one of the embodiment, the cable itself has less weight while the user can have more activities.

FIG. 3A shows how three single color images 302 are being combined visually and perceived as a full color image 304 by human vision. According to one embodiment, three colored light sources are used, for example, red, green and blue light sources that are turned sequentially. More specifically, when a red light source is turned on, only a red image is produced as a result (e.g., from a microdisplay). The red image is then picked up optically and transported by the fiber, and subsequently projected into the prism 262 of FIG. 2F. As the green and blue lights are turned on afterwards and sequentially, the green and blue images are produced and transported respectively by the fiber, and subsequently projected into the prism 262 of FIG. 2F. It is well known that human vision possesses the ability of combining the three single color images and perceives them as a full color image. With the three single color images projected sequentially into the prism, all perfectly registered, the eye sees a full color image.

Also in the second case shown above, the light sources can be nearly invisible. According to one embodiment, the three light sources produce lights near UV band. Under such lighting, three different color images can still be produced and transported but are not very visible. Before they can be presented to the eyes or projected into the prism, they shall be converted to three primary color images that can subsequently be perceived as a full color image. According to one embodiment, the imaging medium 244 of FIG. 2D is provided. FIG. 3B shows that three different color images 310 are generated under three light sources respectively at wavelengths λ, λ2, and λ3, the imaging medium 312 includes three films 314, each coated with a type of phosphor, a substance that exhibits the phenomenon of luminescence. In one embodiment, three types of phosphor at wavelength 405 nm, 435 nm and 465 nm are used to convert the three different color images produced under the three light sources near UV band. In other words, when one such color image is projected onto a film coated with the phosphor at a wavelength 405 nm, the single color image is converted as a red image that is then focused and projected into the prism. The same process is true with other two single color images that go through a film coated with phosphor at wavelength 435 nm or 465 nm, resulting in green and blue images. When such red, green and blue images are projected sequentially into the prism, a human vision perceives them together as a full color image.

In the third or fourth case shown above in the table, instead of using a light either in the visible spectrum or near invisible to human eyes, the light source uses a laser source. There are also visible lasers and non-visible lasers. Operating not much differently from the first and second cases, the third or fourth case uses what is called spatial light modulation (SLM) to form a full color image. A spatial light modulator is a general term describing devices that are used to modulate amplitude, phase, or polarization of light waves in space and time. In other words, SLM+laser (RGB sequentially) can produce three separate color images. When they are combined with or without the imaging medium, a full color image can be reproduced. In the case of SLM+laser (non-visible), the imaging medium shall be presented to convert the non-visible images to a full color image, in which case, appropriate films may be used as shown in FIG. 3B.

Figure 3C:
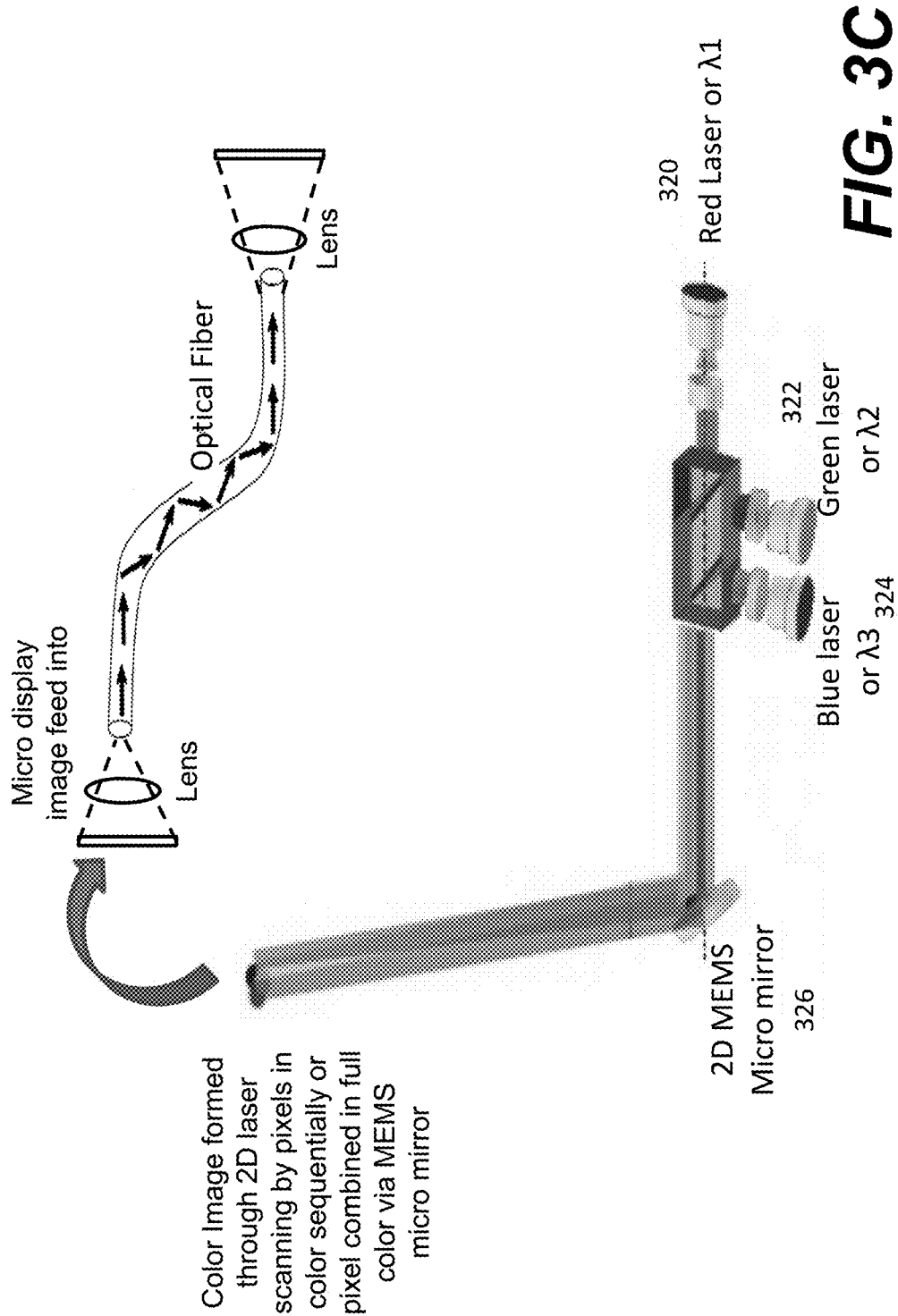
FIG. 3C shows there are three colored laser sources being driven by one or more MEMS to scan a defined area (e.g., a screen)

In the fifth case shown above in the table, an optical image is produced by three colored sources, such as a red laser, a green laser and a blue laser. Depending on the display content, the three colored sources are sequentially turned on to scan a predefined area to show a colored pixel or an image that is subsequently captured and focused onto one end of the optical fiber. FIG. 3C shows there are three colored laser sources 320, 322 and 324 being driven by one or more MEMS 326 (Micro-Electro-Mechanical System) to scan a defined area (e.g., a screen), where the intensity of each of laser beams from the sources 320, 322 and 324 is correlated with one of the three component colors in an image. For example, a color pixel has a set of color values (R, G, B)=(255, 127, 63), the corresponding intensity ratio for the three color lasers is (3, 2, 1). In operation, a red laser emits an intensity (I) of red beam, a green laser emits an intensity ½ I of green beam and a blue laser emits an intensity ⅓ I of blue beam. In one embodiment, the intensities of the laser beams may be adjusted in a cohesive manner to satisfy a color tone.

When a beam is on, the beam is controlled to scan an area by a driver. In one embodiment, the driver is a mirror mounted or driven by a MEMS which is defined as miniaturized mechanical and electro-mechanical elements (i.e., devices and structures) that are made using the techniques of microfabrication. While controlling the MEMS, the beam is caused to scan across the defined area. With all three lasers scanning sequentially, an optical color image is formed and captured for transmission through the optical fiber to the glasses.

In the sixth case shown above in the table, instead of turning on three colored sources sequentially, the three colored sources are turned one at the same time and scanning simultaneously, equally resulting in an optical color image.

In the seventh case shown above in the table, instead of using a visible laser, the light source uses a laser source near invisible to human eyes. Operating not much differently from the fourth or fifth case, an imaging medium is needed to convert the non-visible images to a full color image, in which case, appropriate films may be used as shown in FIG. 3B.

Referring now to FIG. 4, it shows that a waveguide 400 is used to transport an optical image 402 from one end 404 of the waveguide 400 to another end 406, wherein the waveguide 400 may be stacked with one or more pieces of glass or lenses (not shown) or coated with one or more films to from a suitable lens for a pair of glasses for the applications of displaying images from a computing device. It is known to those skilled in that art that an optical waveguide is a spatially inhomogeneous structure for guiding light, i.e. for restricting the spatial region in which light can propagate, where a waveguide contains a region of increased refractive index, compared with the surrounding medium (often called cladding).

The waveguide 400 is transparent and shaped appropriately at the end of 404 to allow the image 402 to be propagated along the waveguide 400 to the end 406, where a user 408 can see through the waveguide 400 so as to see the propagated image 410. According to one embodiment, one or more films are disposed upon the waveguide 400 to amplify the propagated image 410 so that the eye 408 can see a significantly amplified image 412. One example of such films is what is called metalenses, essentially an array of thin titanium dioxide nanofins on a glass substrate.

Figure 5:
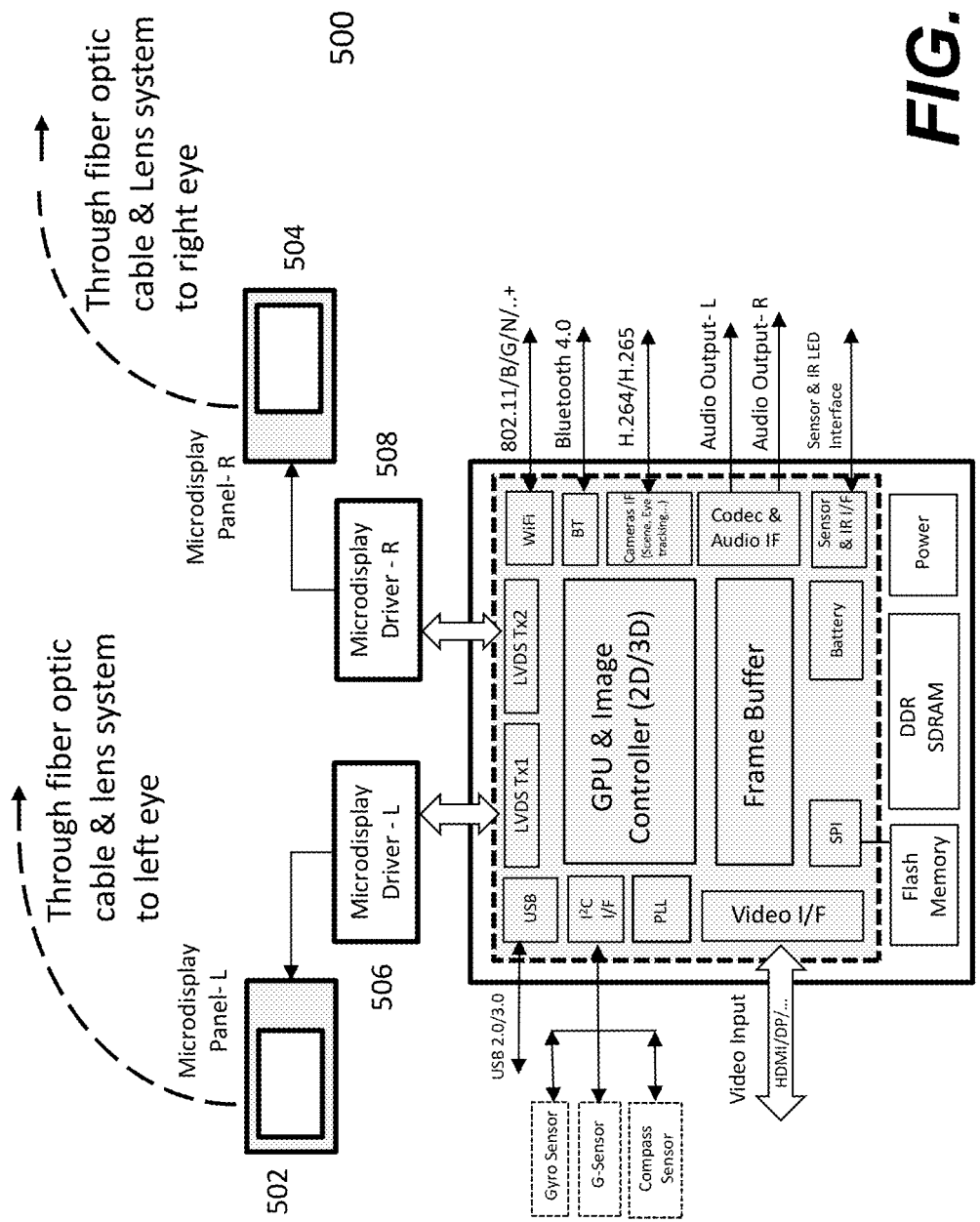
FIG. 5 shows an exemplary functional block diagram that may be used in a separate case or enclosure to produce content related to virtual reality and augmented reality for display on the exemplary glasses of FIG. 2A.

Referring now to FIG. 5, it shows an exemplary functional block diagram 500 that may be used in a separate case or enclosure to produce content related to virtual reality and augmented reality for display on the exemplary glasses of FIG. 2A. As shown in FIG. 5, there are two microdisplays 502 and 504 provided to supply content to both of lenses in the glasses of FIG. 2A, essentially a left image goes to the left lens and a right image goes to the right lens. An example of the content is 2D or 3D images and video, or hologram. Each of the microdisplays 502 and 504 is driven by a corresponding driver 506 or 508.

The entire circuit 500 is controlled and driven by a controller 510 that is programmed to generate the content. According to one embodiment, the circuit 500 is designed to communicate with the Internet (not shown), receive the content from other devices. In particular, the circuit 500 includes an interface to receive a sensing signal from a remote sensor (e.g., the sensor 266 of FIG. 2F) via a wireless means (e.g., RF or Bluetooth). The controller 510 is programmed to analyze the sensing signal and provides a feedback signal to control certain operations of the glasses, such as a projection mechanism that includes a focal mechanism auto-focusing and projecting the optical image onto an edge of the prism 262 of FIG. 2F. In addition, the audio is provided to synchronize with the content, and may be transmitted to earphones wirelessly.

FIG. 5 shows an exemplary circuit 500 to produce the content for display in a pair of glasses contemplated in one embodiment of the present invention. The circuit 500 shows that there are two microdisplays 502 and 504 used to provide two respective images or video streams to the two lenses of the glasses in FIG. 2A. According to one embodiment, only one microdisplay may be used to drive the two lenses of the glasses in FIG. 2A. Such a circuit is not provided herein as those skilled in the art know how the circuit can be designed or how to modify the circuit 500 of FIG. 5.

Figure 6A:
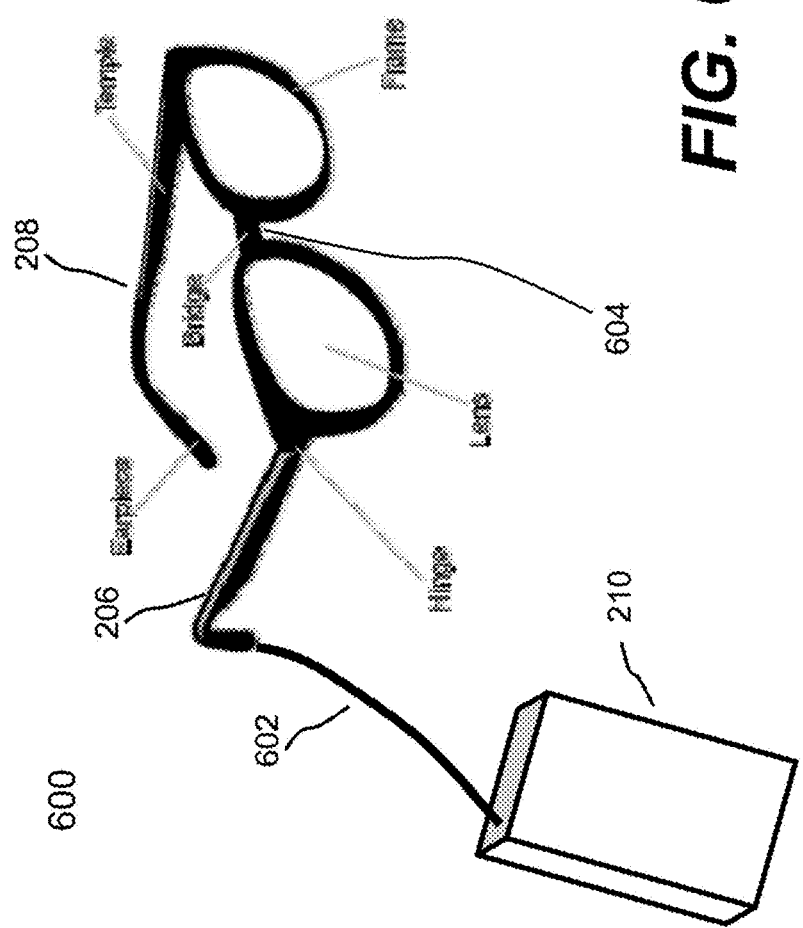
FIG. 6A shows a modified version of FIG. 2A in which a splitting mechanism is used to split an image propagated or transported by an optical cable into two parts (e.g., a left and a right image)

Given one video stream or one image, the advantage is that there is only one optical cable needed to transport the image. FIG. 6A shows a modified version 600 of FIG. 2A to show that one cable 602 is used to couple the enclosure 210 to the glasses 208. Instead of using two optical cables to transport the images from two microdisplays as shown in FIG. 2A, a single optical cable is used to transport the images from one microdisplay. The optical cable may go through either one of the temples of the glasses and perhaps further to part of one top frame. A splitting mechanism disposed near or right on the bridge of the glasses is used to split the images into two versions, one for the left lens and the other for the right lens. These two images are then respectively projected into the prisms or waveguides that may be used in the two lenses.

Figure 6B:
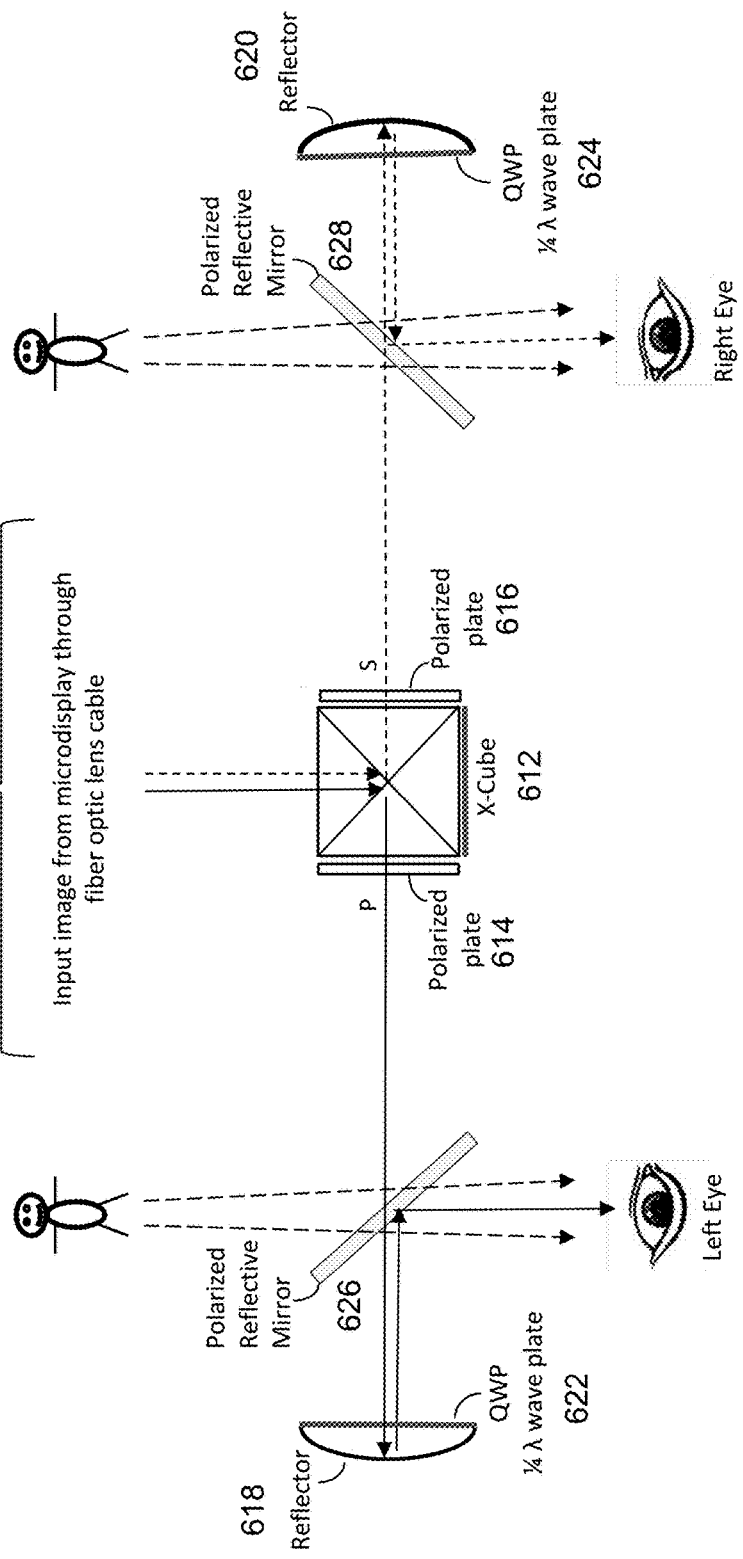
FIG. 6B shows an exemplary splitting mechanism according to one embodiment of the present invention.

To split the image propagated or transported by the cable 602, the glasses 600 are designed to include a splitting mechanism 604 that is preferably disposed near or at the bridge thereof. FIG. 6B shows an exemplary splitting mechanism 610 according to one embodiment of the present invention. A cube 612, also called X-cube beam splitter used to split incident light into two separate components, is provided to receive the image from a microdisplay via the cable 602. In other words, the image is projected onto one side of the X-cube 612. The X-cube 612 is internally coated with certain reflecting materials to split the incident image into two parts, one goes to the left and the other goes to the right as shown in FIG. 6B. A split image goes through a polarized plate 614 or 616 to hit a reflector 618 or 620 that reflects the image back to the polarized reflective mirror 626 or 628. The two polarized plates 614 and 616 are polarized differently (e.g., horizontally and vertically or circular left and right) corresponding to the images sequentially generated either for left eye or right eye. Coated with certain reflective material, the polarized reflective mirror 626 or 628 reflects the image to the corresponding eye. Depending on the implementation, the reflected image from the polarized reflective mirror 626 or 628 may be impinged upon one edge of the prism 262 of FIG. 2F or the waveguide 400 of FIG. 4. Optionally, two wave plates 622 and 624 are respectively disposed before the reflectors 618 and 620.

Figure 7A:
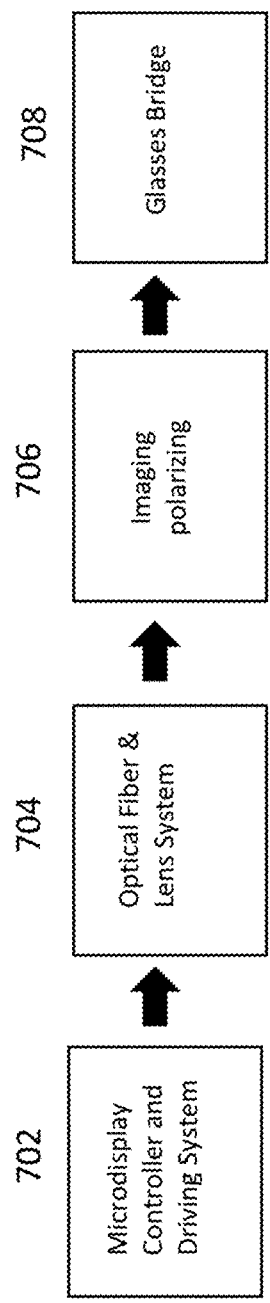
FIG. 7A shows a functional block diagram of displaying multimedia (e.g., graphics, objects, images or videos) in 3D according to one embodiment of the present invention.
Figure 7B:
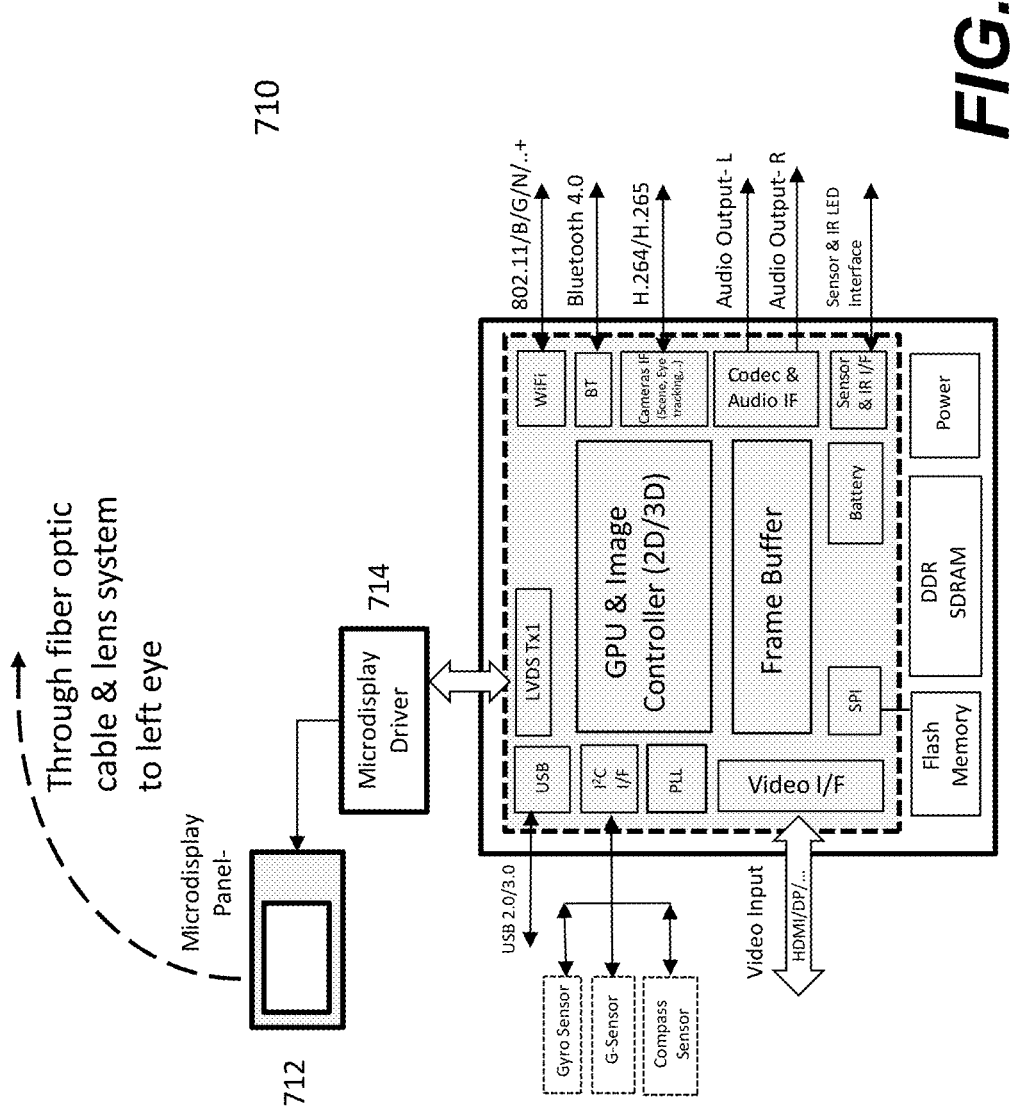
FIG. 7B shows an example of implementation for an electronic portion in FIG. 7A.

Referring now to FIG. 7A, it shows a functional block diagram 700 of displaying multimedia (e.g., graphics, objects, images or videos) in 3D according to one embodiment of the present invention. Referenced by 702 is an electronic/mechanic portion to generate the multimedia. FIG. 7B shows an example of implementation for the electronic portion 702. Comparing to FIG. 5, FIG. 7B uses a single microdisplay 712 driven by a driver 714. According to one embodiment, the electronic portion 702 is packaged in an enclosure carried around or worn by a user. Since there is only one source of images being generated in the electronic portion 702, there is only one fiber cable needed in the block 704, optical fiber and lens system.

Referenced by 706 is where the single source of images is polarized. FIG. 7C shows a liquid crystal panel 720 is used to polarize an image. Liquid crystal is a substance that flows like a liquid but has some degree of ordering in the arrangement of its molecules that can cause the polarization of light waves to change as the waves pass through the liquid. The extent of the change in polarization depends on the intensity of an applied electric field. According to one embodiment, the liquid crystal panel 720 is sandwiched between two sheets or glasses coated with a resistive substance, usually a metal compound called Indium Tin Oxide (ITO) uniformly sputtered thereon. When an image 722 transported from the optical fiber is impinged upon the liquid crystal panel 720, the image is polarized by the controlled liquid crystals in the liquid crystal panel 720. With the switching of the applied electric field via the power 724, the image 722 is polarized into two parts, a p-polarized image and an s-polarized image. In principle, p-polarization is understood to have an electric field direction parallel to the plane of incidence on the liquid crystal panel 720 while s-polarization light has the electric field oriented perpendicular to the liquid crystal panel 720.

Depending on a video standard being used, the incoming image 722 is coming at an image frame rate of F. By alternating the applied electric field, the polarized images are coming out at an image frame rate of 2 F. In other words, for example, when a video is coming at 60 Hz, the output stream 726 is a sequence of alternating polarized images PSPSPS . . . with 120 Hz.

Figure 7D:
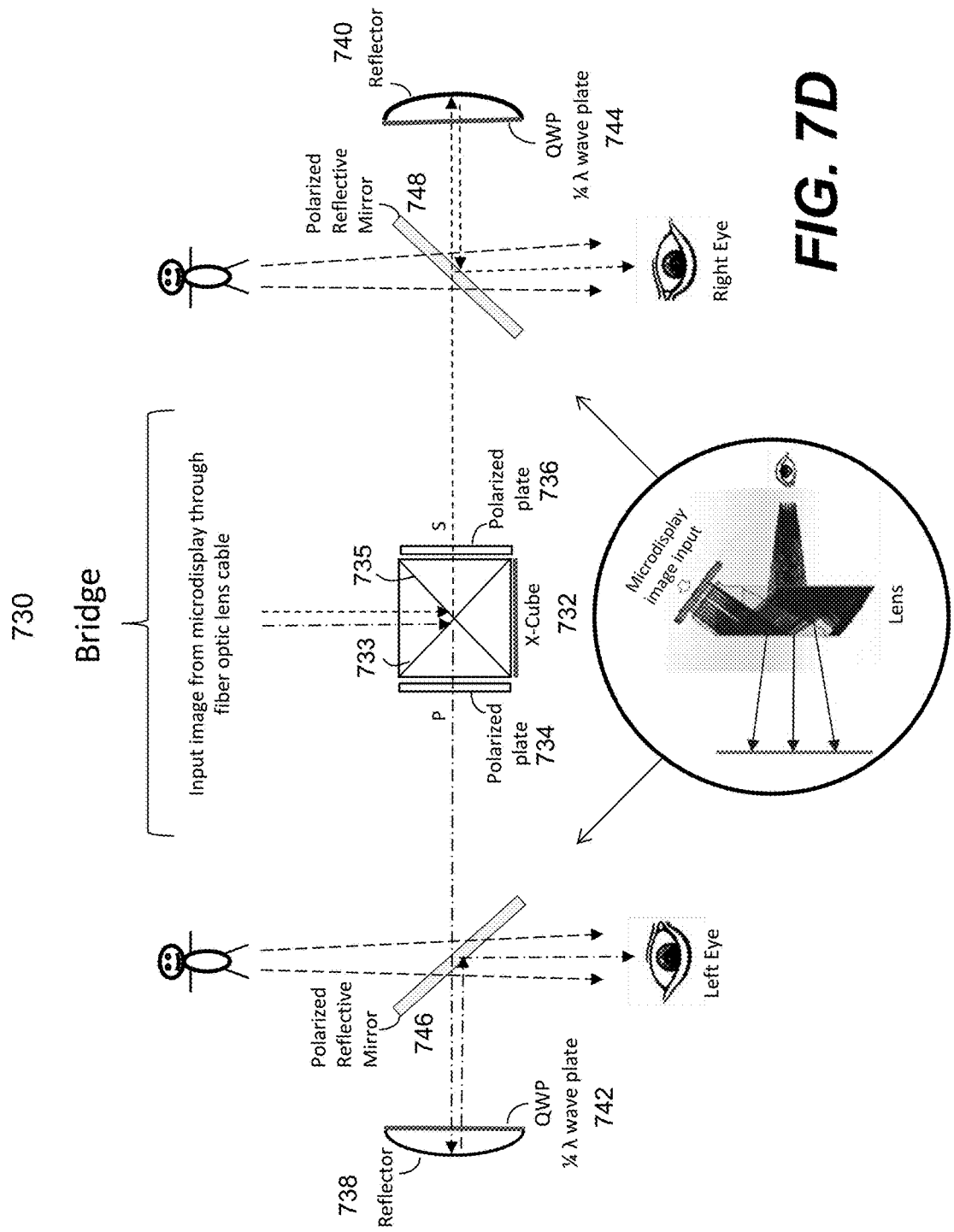
FIG. 7D shows an exemplary implementation of an optical block of FIG. 7A according to one embodiment of the present invention.

FIG. 7D shows an implementation of the block 708 of FIG. 7A according to one embodiment of the present invention. An optical cube 732 (also referred to as X-cube) is disposed near or on a bridge of the glasses implemented in accordance with one embodiment shown in FIG. 2A and FIG. 2F or FIG. 4. The X-cube 732 is sandwiched between two polarized plates 734 and 736. As the alternating polarized image sequence (PSPSPS . . . ) comes and is impinged upon the X-cube 732, the incoming alternating polarized image sequence is redirected both ways by two internal reflectors 733 and 755 of the X-cube 732. In operation, the sequence hits the two internal reflectors 733 and 755, the P sequence is filtered out to the left while the S sequence is filtered out to the right. As a result, one eye sees the P sequence and the other eye sees the S sequence. With the perceived P sequence and S sequence combined, the human eyes see 3D effects.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display apparatus for displaying 3D multimedia, the display apparatus comprising:
   an image polarizer receiving an optical image sequence at a first rate and producing an alternating polarized image sequence at a second rate, the second rate being twice as much as the first rate, wherein each image in the optical image sequence is used to produce simultaneously two orthogonally polarized images in the alternating polarized image sequence;

an optical cube provided to receive the alternating polarized image sequence, wherein the optical cube includes two orthogonally polarized plates sandwiching the optical cube, and decouples the alternating polarized image sequence into two orthogonally polarized image sequences; and a pair of projection mechanisms respectively for two eyes of a human being, wherein each of the projection mechanisms receives one of the two orthogonally polarized image sequences.

2. The display apparatus as recited in claim 1, further comprising:

at least one lens, and an optical cable including at least one optical fiber to transport the optical image from one end of the optical cable to another end of the optical cable by total internal reflections in the optical fiber, wherein the optical image is projected by the at least one lens onto the image polarizer.

3. The display apparatus as recited in claim 2, wherein the image polarizer is an active shutter.

4. The display apparatus as recited in claim 2, wherein the image polarizer includes a liquid crystal layer sandwiched between two transparent layers, wherein the liquid crystal layer is applied with an electric field.

5. The display apparatus as recited in claim 4, wherein each of the projection mechanisms includes a prism receiving the one of the two orthogonally polarized image sequences from a first edge of the prism, the one of the two orthogonally polarized image sequences is seen by one of the eyes in the prism.

6. The display apparatus as recited in claim 5, wherein each of the projection mechanisms further includes an optical correcting lens integrated with the prism to correct an optical path coming out from the prism.

7. The display apparatus as recited in claim 6, wherein the prism and the optical corrector are stacked so that a user sees through the integrated lenses without optical distortion.

8. The display apparatus as recited in claim 4, wherein each of the projection mechanisms includes a set of variable focus elements, at least one of the variable focus elements is adjustable to focus the optical image from the optical fiber onto the first edge of the prism.

9. The display apparatus as recited in claim 4, wherein each of the projection mechanisms includes an optical waveguide receiving the one of the two orthogonally polarized image sequences projected onto one side of the optical waveguide and propagating the one of the two orthogonally polarized image sequences to another side of the optical waveguide, where the one of the two orthogonally polarized image sequences is seen.

10. The display apparatus as recited in claim 1, wherein a part of the optical cable is enclosed within or attached to a portion of an article of clothing.

11. A display apparatus for displaying 3D multimedia, the display apparatus comprising:

a pair of lenses;

a bridge disposed between the lenses;

an image polarizer receiving an optical image sequence at a first rate and producing an alternating polarized image sequence at a second rate, the second rate being twice as much as the first rate, wherein each image in the optical image sequence is used to produce simultaneously two orthogonally polarized images in the alternating polarized image sequence; and an optical cube, disposed near or on the bridge, receiving the alternating polarized image sequence, wherein the optical cube sandwiched between two orthogonally polarized plates splits the alternating polarized image sequence into two orthogonally polarized image sequences, each projected into an edge of one of the two lenses.

12. The display apparatus as recited in claim 11, wherein the optical image sequence is transported by an optical cable including an optical fiber provided to transport the optical image from one end thereof to another end thereof by total internal reflections therein, and wherein the optical image is from a microdisplay.

13. The display apparatus as recited in claim 12, wherein the two orthogonally polarized image sequences are respectively projected onto the lenses.

14. The display apparatus as recited in claim 12, wherein the two orthogonally polarized image sequences are respectively projected onto an edge of each of the lenses.

15. The display apparatus as recited in claim 11, wherein each of the lenses includes a prism receiving the one of the two orthogonally polarized image sequences from a first edge of the prism, the one of the two orthogonally polarized image sequences being seen by one of the eyes through the prism.

16. The display apparatus as recited in claim 15, wherein each of the lenses further includes an optical correcting lens integrated with the prism to correct an optical path coming out from the prism.

* * * * *